(12) United States Patent
Latino et al.

(10) Patent No.: US 7,913,487 B2
(45) Date of Patent: Mar. 29, 2011

(54) POLLUTION CONTROL DEVICE AND METHOD OF SERVICING SAME

(75) Inventors: Eric Latino, Ashburn (CA); Ron Krentz, Toronto (CA)

(73) Assignee: Global Emissions Systems Inc, Whitby, Ontario (CA)

( * ) Notice: Subject to any disclaimer, the term of this patent is extended or adjusted under 35 U.S.C. 154(b) by 531 days.

(21) Appl. No.: 11/381,059

(22) Filed: May 1, 2006

(65) Prior Publication Data
US 2006/0275186 A1 Dec. 7, 2006

Related U.S. Application Data

(63) Continuation-in-part of application No. 09/998,776, filed on Dec. 3, 2001, now abandoned.

(30) Foreign Application Priority Data

Feb. 28, 2001 (CA) .................................... 2338942

(51) Int. Cl.
*F01N 3/00* (2006.01)
(52) U.S. Cl. ................ 60/286; 60/299; 60/324

(58) Field of Classification Search .................... 60/274, 60/289, 299, 324
See application file for complete search history.

(56) References Cited

U.S. PATENT DOCUMENTS

| | | | | |
|---|---|---|---|---|
| 3,736,105 A | * | 5/1973 | Tourtellotte | 422/176 |
| 3,852,041 A | * | 12/1974 | Moore et al. | 422/176 |
| 3,950,139 A | * | 4/1976 | Cannon | 422/181 |
| 3,963,448 A | * | 6/1976 | Hartley et al. | 422/181 |
| 4,238,454 A | * | 12/1980 | Roberts et al. | 422/171 |
| 4,866,932 A | * | 9/1989 | Morita et al. | 60/288 |
| 5,519,993 A | * | 5/1996 | Rao et al. | 60/288 |
| 5,853,437 A | * | 12/1998 | Peter et al. | 55/282.3 |

* cited by examiner

Primary Examiner — Thomas E Denion
Assistant Examiner — Diem Tran
(74) Attorney, Agent, or Firm — Hodgson Russ LLP

(57) ABSTRACT

This device is a pollution control device for reducing harmful emissions found in combustion gases. The device has a body having a first portion and a second portion, releasably connected together to form a chamber therebetween. The device also has an exhaust gas inlet, and an exhaust as outlet. The pollution control device has at least one web member across the chamber, and a plurality of catalytic converter elements held in the web member. In use, exhaust gases pass through the catalytic converter elements when passing through the chamber between the exhaust gas inlet and outlet.

12 Claims, 5 Drawing Sheets

POLLUTION CONTROL DEVICE AND METHOD OF SERVICING SAME

FIELD OF THE INVENTION

This invention relates to pollution control devices and in particular to pollution control devices for reducing harmful gaseous emissions contained in exhaust gases from combustion sources.

BACKGROUND OF THE INVENTION

Combustion, either in internal combustion engines, or in burners and the like, is used widely to convert energy from one form to another. Recently internal combustion engines have been used to burn combustible gases produced from decomposing garbage at, for example, landfill sites. The internal combustion engines are connected to electrical generators and the combustible gases which would otherwise be dissipated in the atmosphere are collected, burned and electrical power generated as a result. In times of rising energy costs, such recovery techniques are both efficient and desirable.

Other power generation techniques involve burning fossil fuels to produce heat, and then steam and then electricity. While some fuels, such as gas, are relatively clean burning, other fuels, such as coal, are very dirty and produce much noxious pollution.

A common feature of power generating combustion sources is their large size. Further, unlike for example, automobiles where the quality of the fuel is closely regulated and generally uniform, the quality of combustible gases from landfill sites and even the quality of coal used to fire generating stations, can vary widely. Thus, to achieve consistent results, such combustion sources tend to burn hotter which in turn tends to produce high temperature exhaust gases, in the order of 500 degrees C. or more. Such large sized and hot combustion sources are also notoriously polluting, partly because they tend to run constantly for long periods.

Catalytic converters are well known devices, used for example in automobile exhaust systems. Such converters include metal catalysts, which facilitate certain beneficial chemical reactions in an exhaust gas stream. Manipulation of the catalytic chemistry can help cause pollution reduction effects on a range of exhaust gases and also eliminate or greatly reduce a range of noxious pollutants, such as semi-burnt or unburnt hydrocarbons, NOX, CO and the like. Modern automobile engines tend to run very cleanly, and thus there is a reduced need for catalytic converters. It would not be uncommon for a catalytic converter to outlast a modern automobile. Further, because vehicle engines tend to only run periodically, there are different pollution control issues than for power generator combustion sources.

SUMMARY OF THE INVENTION

An object of the present invention is to provide a device for use in the treatment of harmful exhaust gases produced as a by-product of combustion from generally continuously running combustion sources for the purpose of reducing harmful emissions which may be contained in the exhaust gases. Most preferably, the device includes a modular construction which permits the easy replacement of elements as needed and is configured to operate at high temperatures in excess of 500 degrees C. Further, the device preferably is able to treat other types of gaseous pollutants to ensure that treatment of the most troublesome gases can occur. In some aspects, the present invention provides for the addition of additional gases to improve pollution control of specific pollutants. Lastly, the present invention is simple and easy to install and achieves effective pollution reduction.

According to one aspect of the present invention there is provided a pollution control device for reducing harmful gaseous emissions found in combustion exhaust gases, said device comprising:

a body having a first portion and a second portion releasably connected together to form a chamber therebetween,
an exhaust gas inlet on said body,
an exhaust gas outlet on said body,
at least two web members extending across said chamber, each of said web members having a plurality of catalytic converter elements held in said web members, and
an injector for injecting gaseous reagents between said at least two web members to improve pollution control effects;
wherein said exhaust gases pass through said catalytic converter elements when passing through said chamber from said inlet to said outlet.

According to a further aspect of the present invention there is provided a method of servicing a pollution control device comprising;

a) supporting said device in place;
b) separating a first portion from a second portion;
c) removing and replacing a web and associated catalytic conversion elements; and
d) releasably attaching said first and second portions together again.

According to still a further aspect of present invention there is provided a pollution control device for reducing harmful gaseous emissions found in combustion exhaust gases said device comprising;

a body having an inlet and an outlet and a chamber formed therebetween;
at least two webs forming barriers across the chamber between the inlet and the outlet, each of said webs having a plurality of openings formed therein; and
a plurality of catalytic converter elements held in said openings in each of said webs and
an injector for injecting gaseous reagents between said webs to improve pollution control effects;
wherein said exhaust gases are forced by said web to pass through said catalytic converter elements.

BRIEF DESCRIPTION OF THE DRAWINGS

Reference will now be made to the accompanying drawings, which depict, by way of example only, illustration of preferred embodiments of the invention and in which.

DETAILED DESCRIPTION OF THE PREFERRED EMBODIMENTS

Figure 1:
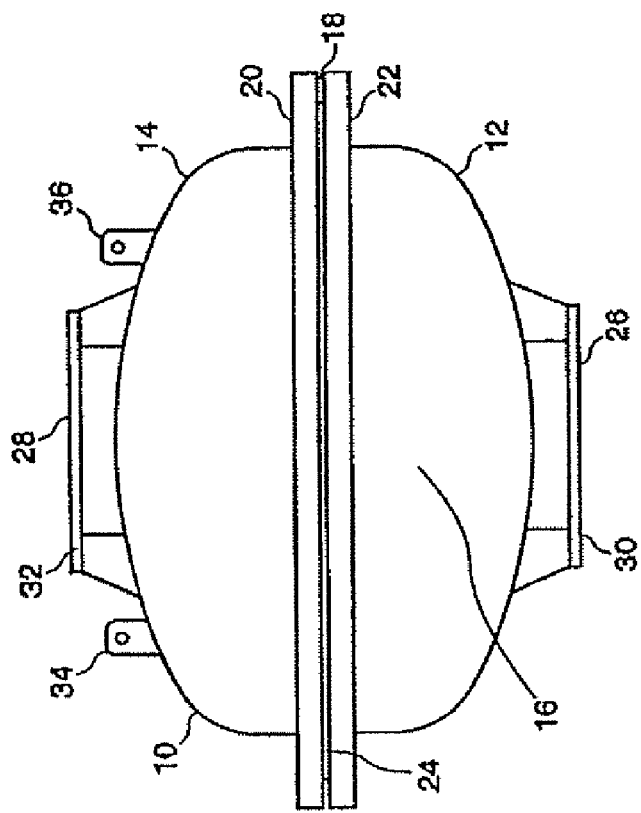
FIG. 1 is a side view of a pollution control device according to the present invention.

A pollution control device 10 according the present invention is shown in FIG. 1. The pollution control device 10 includes a first portion 12 and a second portion 14 which are releasably attached together to form a chamber 16. Most preferably, the releasable attachment is in the form of a plurality of bolts or threaded fasteners 18. Each of the first portion 12 and the second portion 14 are provided with respective flanges 20, 22 through which the bolts 18 may pass. A high temperature sealing gasket 24 is also provided between the flanges 20, 22. The sealing gasket is preferably made from a high temperature seal such as a spiral wound stainless steel or chrome-molybdenum or ring type joint. Further, while preferred, the sealing gasket may not be required in all applications, due to a low head loss through the device 10 as explained in more detail below.

Located on the first portion 12 is an inlet 26 and located on the second portion 14 is an outlet 28. When the first and second portions are bolted together, a chamber 16 is formed between the inlet 26 and the outlet 28. This chamber 16 is described in more detail below.

Associated with each of the inlet and outlet are attachment flanges 30, 32. Also, for ease of transportation and installation, lifting ears 34, 36 may be provided. This simply enables the device 10 to be lifted by an overhead crane or the like and held in position so that the device 10 may be connected to a stream of exhaust gases from a combustion source. In this specification, the term exhaust gases shall mean the by-products of a combustion including unburnt or semi-burnt gaseous hydrocarbons, NOX, CO and the like. A combustion source shall mean, for example, an internal combustion engine, a burner, or other controlled combustion device which uses fuel to create thermal energy.

Figure 2:
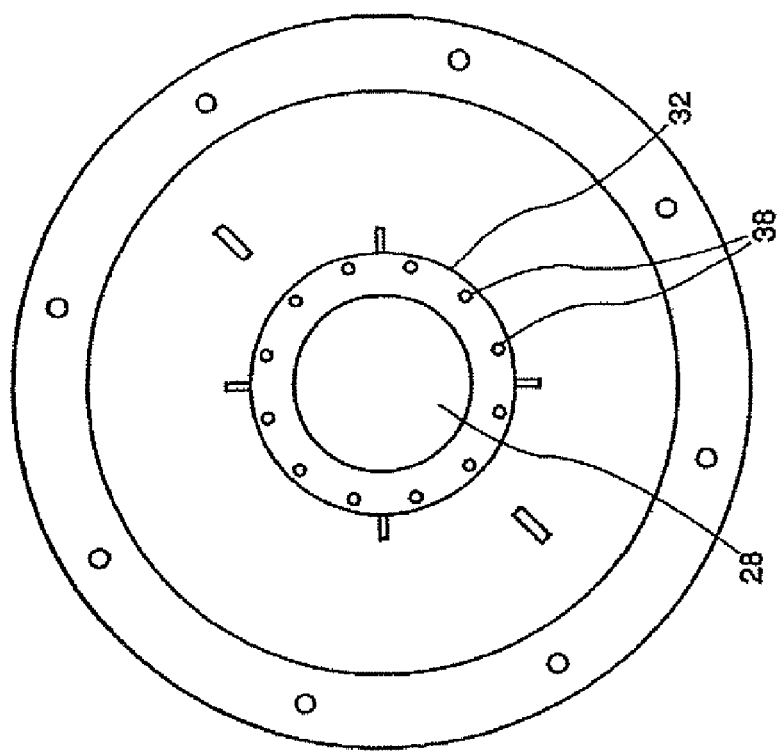
FIG. 2 is a top view of the device of FIG. 1.

FIG. 2 is a view from above of the device 10 of FIG. 1. Associated with the outlet flange 32, are a plurality of holes 38 suitable for bolts or the like. In this manner, the device 10 can be bolted directly to a conduit, like a stack, transporting combustion by-products, to form a continuous tube with said conduit. It will be appreciated that once the first and second portions are bolted together, and once the inlet and outlet are bolted onto the combustion by-product conduit or stack, the by-products will flow from the combustion source into the inlet 26 through the chamber 16 through the outlet 28 and then into the remainder of the conduit.

Figure 3:
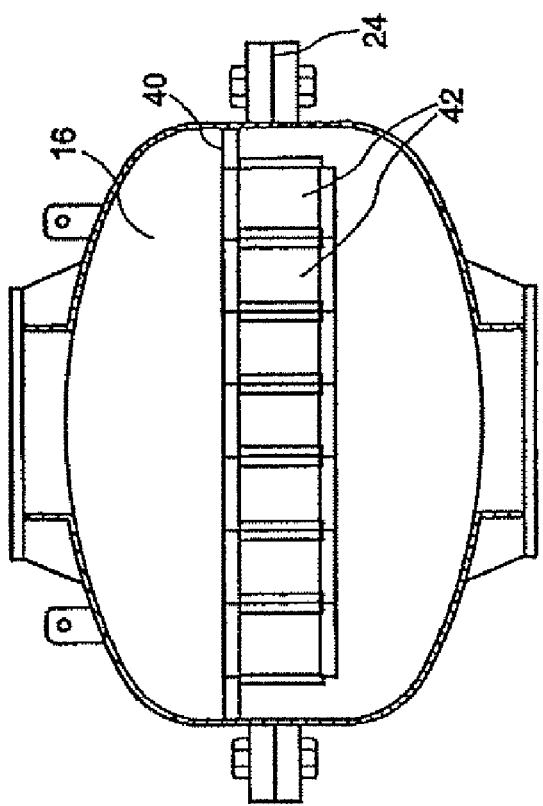
FIG. 3 is a sectional view of the device of FIGS. 1 and 2.

Turning to FIG. 3, a side view of the interior of the present invention is shown. Located in the chamber 16 is a web 40. The web 40 carries a plurality of canisters 42 each of which contains a substrate coated with catalytic chemistry. The web 40 is continuous and extends around the full periphery of the chamber 16. In the preferred embodiment the web is releasably clamped between the first and second portions. In this manner, exhaust gases are forced to flow through the catalytic canisters, exposing the exhaust gases to the beneficial catalytic surfaces of the substrate. Most preferably, the web canister connection is a releasable connection and is substantially airtight. Such a releasable connection may be made by a friction fit, or other releasable attachment. Alternatively, the canister may be fixed to the web 40. The web 40 and the canisters 42 may be made from a high temperature resistant material (to temperatures in excess of 500 degrees C.) which is strong enough to carry the canisters 42. Making the web from stainless steel has been found to yield suitable results.

The catalytic chemistry applied to the substrate which forms the body of the catalytic components can vary and can be tailored to suit the type of exhaust gases being treated. Most preferably the catalytic components are made by applying a chemical wash coat to a porous substrate. The substrate causes the exhaust gases to break into very small streams (because, for example, the substrate includes 200 small holes per square inch surface area), to promote efficient contact between the exhaust gases and the chemical wash coat. A preferred substrate can be obtained from Dow Corning, while a preferred high temperature wash coat is available from Asec Manufacturing of Tulsa, Okla. As will be understood by those skilled in the art, the catalytic converter wash coat can incorporate one or more of any of the catalytic metals such as, but not limited to Platinum, Rhodium, and Palladium, which are used to treat, for example, gases such as CO, NOX and semi-burnt hydrocarbons. Nickel is also sometimes added to treat sulphur smells. Other gas treating catalytic elements can be used. A suitable wash coat is applied, for example, in 35 gms/square foot, with a composition of Platinum 5 parts, Rhodium 1 part and Palladium 0 parts. An example of another suitable wash coat that may be applied is 50 gms/square foot comprising Platinum 5 parts, Rhodium 0 parts and Palladium 1 part. Wash coats of up to about 70 gms/square foot may be applied. Of course many variations in wash coat composition can be used, depending upon the exhaust gases to be treated.

In an embodiment of the invention, the body or element of the catalytic converter is tubular and is contained in a metal shroud or can. An insulator can be used between the metal and the body to prevent short circuiting of the exhaust gases past the catalytic body. In this manner, the exhaust gases are forced through the body and exposed to the benefits of the catalysts.

The present invention comprehends having a sufficient total cross-sectional area of treated substrates so that there is little or no pressure drop across the chamber between inlet and outlet. For example, the combined exhaust gas passage ways through all the catalytic canisters may be made at least equal to or greater than the total area of the exhaust conduit. Most preferably, the exhaust gas venting area through the canisters is slightly larger than the cross-sectional area of the stack to create little or no pressure drop through the chamber. As will be understood, the greater the total cross-sectional area of the exhaust gas passage ways the slower the passage of the exhaust gases through the substrates. This will permit a greater contact time between the catalytic surfaces and the exhaust gases thereby improving pollution control. Lastly, by avoiding a significant pressure drop, pollution control is achieved without affecting performance of the combustion source which could suffer if a significant back pressure occurred. As a result of a low pressure drop, the need for a seal or sealing gasket 24 is also reduced. However, it is still desirable to ensure that the exhaust gases pass through the catalytic converter canister elements to reduce pollution.

Figure 4:
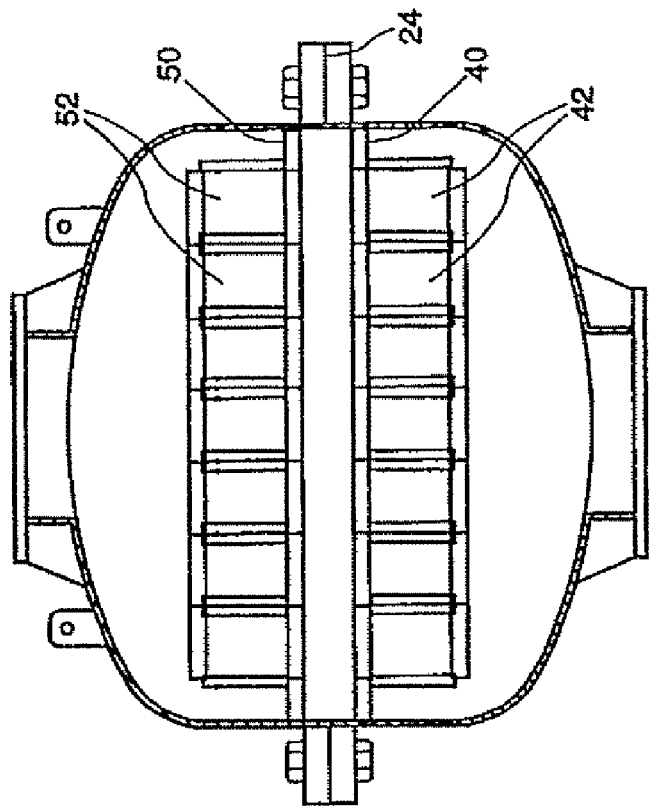
FIG. 4 is a sectional view of a farther embodiment of the present invention.

Turning to FIG. 4, a further embodiment of the present invention is disclosed in which a second web 50 together with a second set of canisters 52 is provided within the chamber. The use of two racks of canisters permits the nature of the catalyst in the catalytic surfaces of the canisters to be varied between one rack and the next. In this manner, the exhaust gases can be more effectively treated to reduce specific forms of pollutants. By way of example, a downstream rack (web plus canisters) could be configured to primarily reduce NOX.

Figure 5:
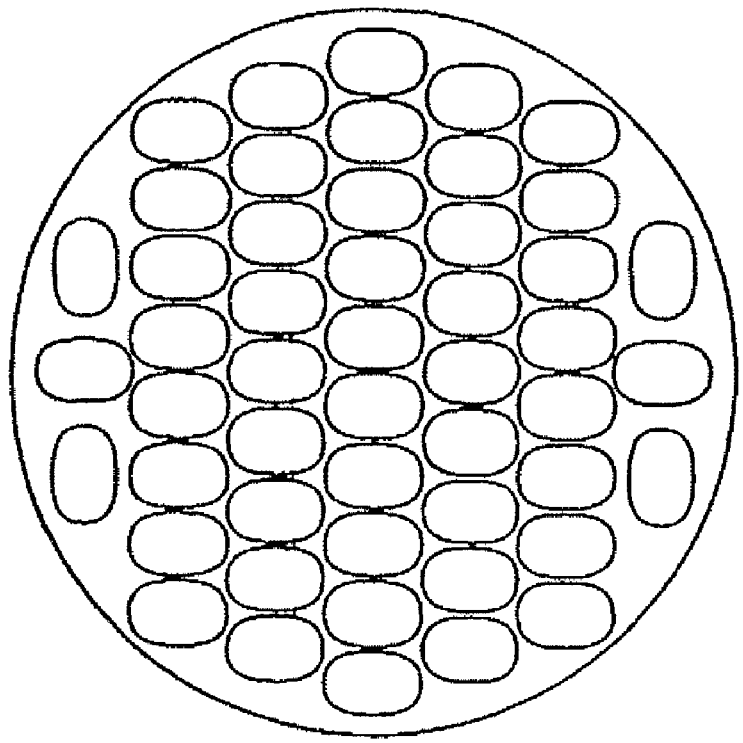
FIG. 5 is a view of a web having one pattern according to the present invention.

FIG. 5 shows a web having a hole pattern suitable for retaining a plurality of canisters. The shape of the canisters can vary and one form of the canisters is a generally oval shape as shown.

Figure 6:
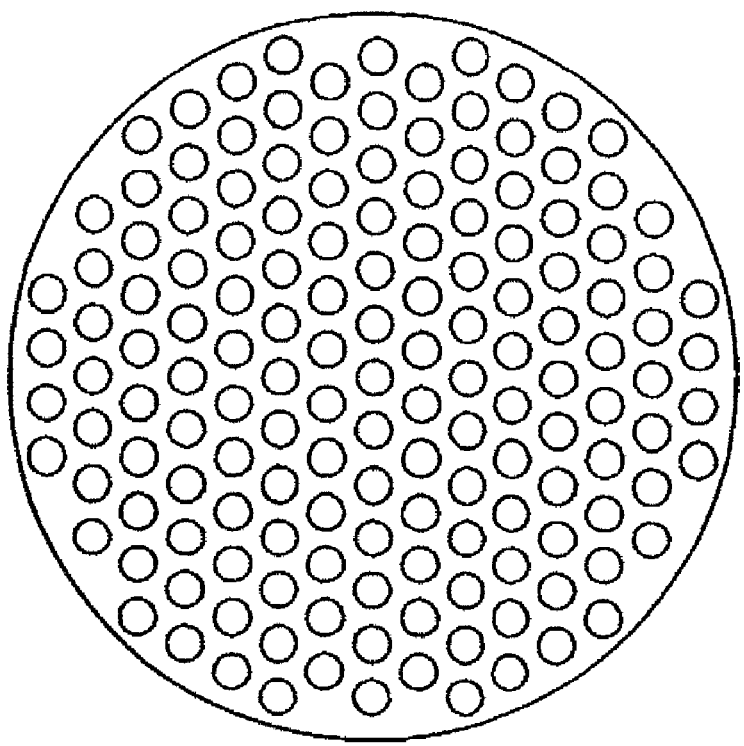
FIG. 6 is a view of a second web having a second pattern according to the present invention.

FIG. 6 shows an alternate hole pattern in which the shape of the canisters is generally circular. It will be appreciated by those skilled in the art that the present invention comprehends many different forms and patterns of catalyst canisters. What is important is to provide a sufficient catalytic surface to attain the desired benefits to the exhaust gas produced by the combustion source. Therefore, what is needed is a sufficient cross-sectional area through the catalytic canisters for the exhaust gas stream so that a significant pressure drop is avoided. Significant in this sense is any pressure drop which unacceptably affects the performance of the combustion source, such as an engine.

The advantages of the present invention can now be understood. Firstly, by reason of the flanged inlet and outlet, the device 10 may be easily retrofitted into an existing exhaust conduit, with a minimal disruption, effort or expense. Once installed, it is thereafter possible to monitor the pollution controlling effect, and, if necessary service the device to adjust its performance.

It will be understood by those skilled in the art that the high temperature continuous burn combustion engines may be hard on catalytic converters. In particular, corrosive elements can build up which eventually interfere with the pollution control reactions fostered by the catalytic converter. If this occurs, an outright replacement of the converter elements may be required. Also, if too much of one type of pollutant is being produced, it is possible to simply procure a new set of canisters having a different chemistry more appropriate to the exhaust stream. This might be necessary, for example, to accommodate a change in the fuel being burned. To service the device, all that is required is to support the second portion 14 by the lifting ears, unbolt the flanges 20, 22 and open the chamber 16. The web 40 can then be removed, canisters 42 removed from the web 40, and replaced as needed or the whole rack may be replaced, and the device 10 re-assembled for further use. It can now be appreciated that a preferred way to secure the racks in the chamber is to make the web sized and shaped to be gripped between flanges 20, 22. Thus, as part of routine maintenance, or, as part of an effort to achieve improved performance, the present invention permits the easy disassembly and removal of malfunctioning canisters, to be replaced with improved canisters. This saves time, and expense since the whole unit need not be replaced.

Figure 7:
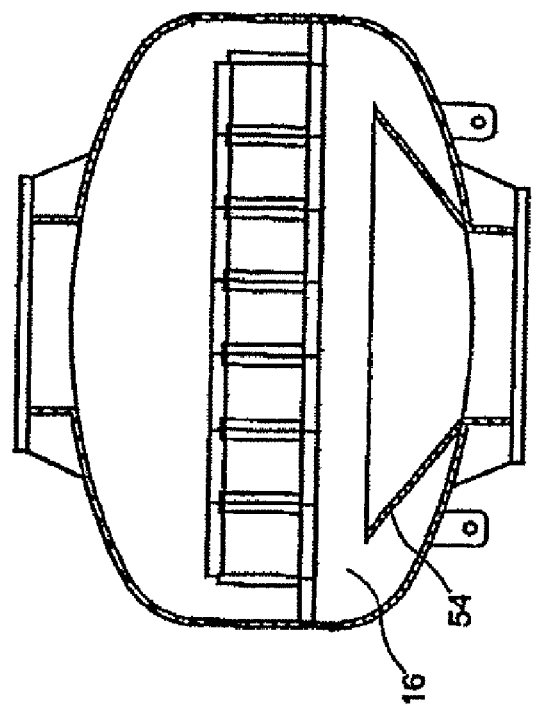
FIG. 7 is the invention of FIG. 1 including an air deflection means.

FIG. 7 shows a further embodiment of the present invention in which a flow control means or baffle 54 has been inserted to improve the flow of combustion by-products or exhaust gases through the chamber 16. The baffle 54 helps reduce the pressure drop across the chamber 16 while promoting a smooth transition between the faster flow in the conduit and the slower flow in the chamber 16. This promotes an even distribution of the exhaust gases through the chamber 16 which in turn leads to improved pollution control performance.

Figure 8:
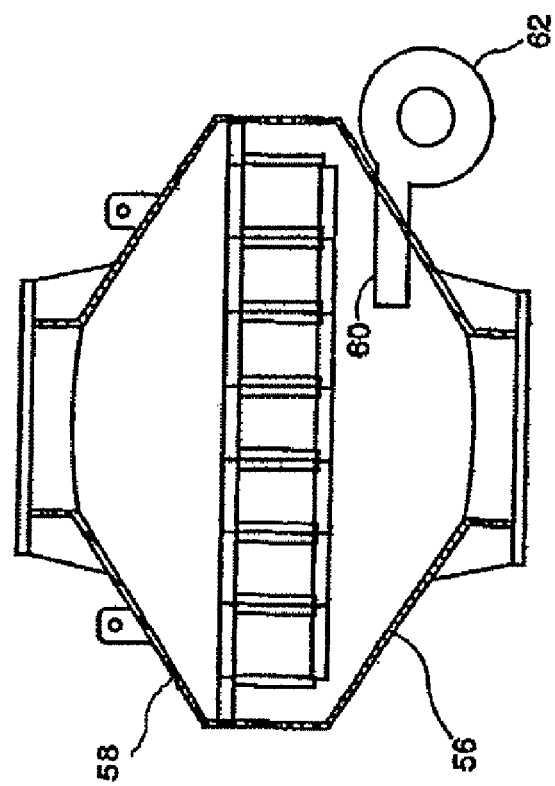
FIG. 8 is a modified embodiment incorporating an air deflection means.

FIG. 8 is an equivalent structure to that of FIG. 7, but rather than using a separate gas flow control means or baffle, the first portion between the inlet and the web is conically shaped at 56 and the second portion at 58 to provide a similar function.

Figure 9:
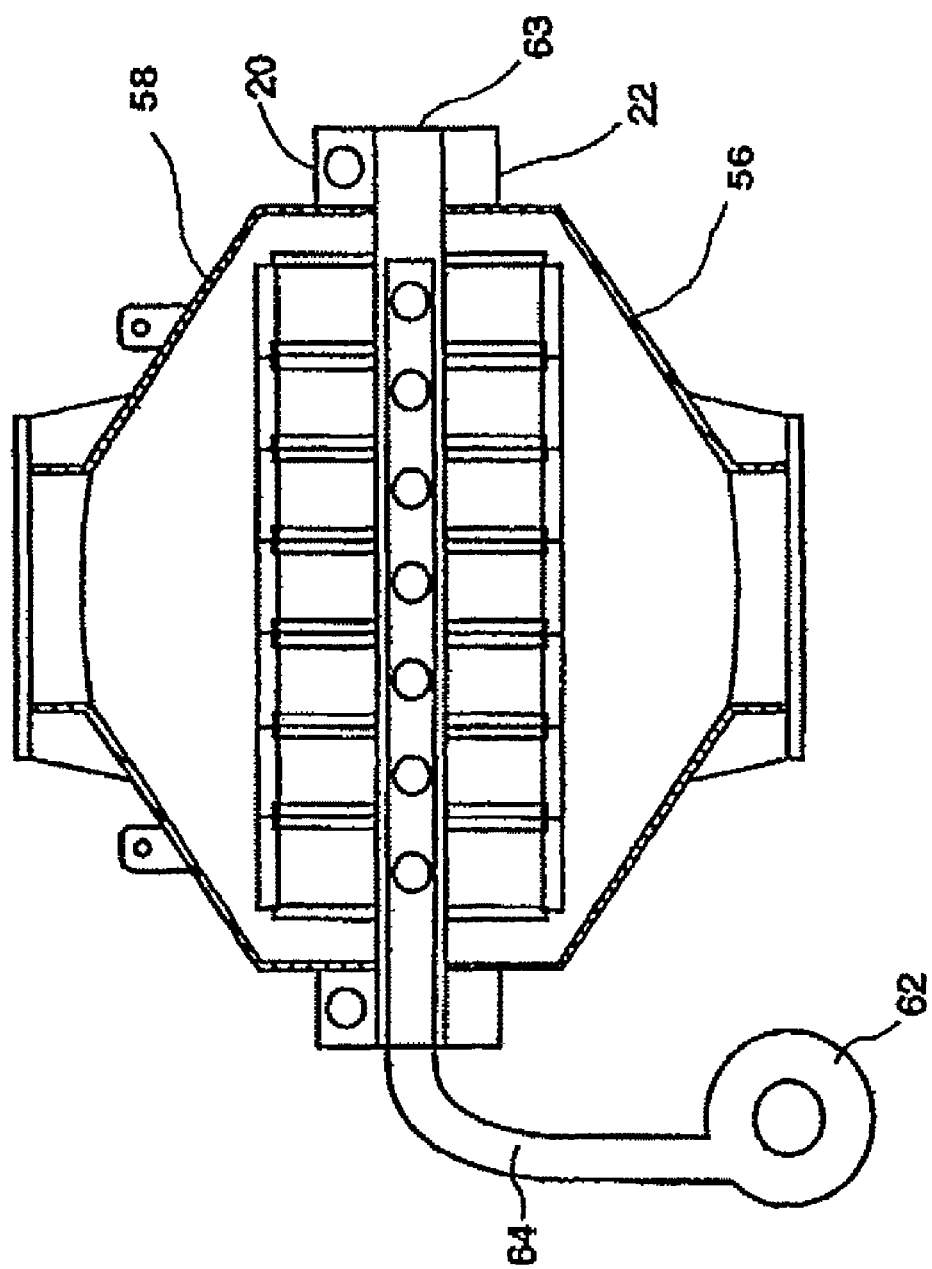
FIG. 9 is a further embodiment showing gas injection system.

Also shown in FIG. 8 is an injector 60 provided in the chamber. The injector 60 permits gas to be pumped into the chamber, to facilitate the catalytic reactions. The gas may be air or another gas which is pumped into the chamber for improving results. The exact nature of the gas to be pumped and volumes depend upon the type of combustion occurring in the combustion source which is producing the exhaust gases passing through the chamber, as well as the chamber temperature, catalytic wash coat and the like. The present invention comprehends the use of the injector to favorably alter the chemical reactions occurring in the chamber, and more specifically at a specific location in the chamber adjacent to and downstream of the injector to add gaseous reagents to improve the pollution control effects. In some cases a blower 62 may be used to provide the necessary injection pressure through the injector. The injector may include a manifold 64 to evenly distribute the injection gases and may be located either before both racks or in a multiple rack configuration in between racks as desired (see FIG. 9). In the event it is to be located between two racks, it may be necessary to use a spacer 63 to space apart the webs, to provide enough space therebetween to permit the gas distribution manifold 64 to be located there.

The present invention also comprehends providing sample extraction points formed in the first and second portions, which are for the purpose of withdrawing gas samples for testing the composition of the exhaust gas as it passes through the chamber. Such sample extraction points may take the form of small holes, and may be located both upstream and downstream of the catalytic elements, for the purpose of gauging the effectiveness of the pollution abutment.

The present invention is particularly suited for rich burn engines. Rich burn engines typically have an air to fuel ratio below that of an ideal stoichiometric ratio of 14.6 to 1 air to fuel. Exhaust gases from rich burn engines, which may contain unburnt or semi-burnt gaseous hydrocarbons, NOX, CO and the like, may be reduced by utilizing the present invention. The present invention may also be used in standing generator units, fork lifts, lawn mowers and other rich burn engines.

It will be understood by those skilled in the art that various embodiments of the invention have been described above and that modifications and alterations can be made without departing from the spirit of the scope of the claims attached. For example, while two specific shapes of catalytic canister have been shown, many other shapes of canister may be used.

We claim:

1. A pollution control device for reducing harmful gaseous emissions found in combustion exhaust gases, said device comprising:
   a body having a first portion and a second portion releasably connected together to form a chamber therebetween;
   an exhaust gas inlet on said body, said inlet defining an exhaust gas flow through area;
   an exhaust gas outlet on said body;
   at least one web member extending across said chamber, said at least one web member being sized and shaped to block a flow of said exhaust gases through said chamber, said at least one web member having a plurality of openings therethrough and a plurality of flow through catalytic converter elements held in said openings, said plurality of flow through catalytic converter elements:
   a) permitting the flow of said exhaust gases there-through from said inlet to said outlet,
   b) defining an exhaust gas flow through area at least equal to said exhaust gas flow through area of said inlet; and
   c) having catalytic surfaces for treating said exhaust gasses; and
   d) a conical flow control baffle extending into said chamber from said inlet toward the at least one web member to distribute the flow of said exhaust gases evenly to said plurality of flow through catalytic converter elements,
   wherein said device experiences substantially no pressure drop across the chamber between said inlet and said outlet.

2. A pollution control device as claimed in claim 1 wherein said flow through catalytic converter elements are releasably held in said at least one web member.

3. A pollution control device as claimed in claim 1 wherein said flow through catalytic converter elements are fixed in said at least one web member.

4. A pollution control device as claimed in claim 1 further including at least one sample extraction point in said body for withdrawing samples of said exhaust gas as it passes through said chamber from said inlet to said outlet.

5. A method of servicing a gaseous pollution control device according to claim 1, the method comprising:
 a) supporting said device in place;
 b) separating a first of the portions of said device from a second of the portions of said device;
 c) removing and replacing a web member and associated flow through catalytic converter elements; and
 d) releasably attaching said first and second portions together again.

6. A pollution control device as claimed in claim 1 comprising at least two web members extending across said chamber, each of said at least two web members having a plurality of openings and a plurality of flow through catalytic converter elements held in said openings in said web members.

7. A pollution control device as claimed in claim 6 wherein each of said flow through catalytic converter elements comprises a canister having a predetermined size and shape and a coated substrate contained within said canister, and said flow through catalytic converter elements on each of said web members are the same.

8. A pollution control device as claimed in claim 6 wherein each of said flow through catalytic converter elements comprises a canister having a predetermined size and shape and a coated substrate contained within said canister, and said flow through catalytic converter elements located on the same web member are the same, and at least one web member holds flow through catalytic converter elements that are different from those held on at least one other web member.

9. A pollution control device as claimed in claim 6, further comprising a spacer on said body between said at least two web members.

10. A pollution control device as claimed in claim 6 further comprising an injector for injecting gaseous reagents between said at least two web members to improve pollution control effects.

11. A pollution control device as claimed in claim 10 further including a blower associated with said injector.

12. A pollution control device as claimed in claim 10 further comprising a manifold extending across said chamber and between said at least two web members, wherein said manifold is for evenly distributing said gaseous reagents to said at least two web members.

* * * * *